Patented Dec. 17, 1929

1,739,863

UNITED STATES PATENT OFFICE

LEO ROSENTHAL AND WOLFGANG LENHARD, OF VOHWINKEL, GERMANY, ASSIGNORS TO I. G. FARBENINDUSTRIE AKTIENGESELLSCHAFT, OF FRANKFORT-ON-THE-MAIN, GERMANY

PRODUCTION OF ESTERS OF SACCHARIDES OF HIGHER UNSATURATED FATTY ACIDS

No Drawing. Application filed October 28, 1924, Serial No. 746,406, and in Germany November 10, 1923.

The present invention relates to the production of the hitherto unknown esters of poly unsaturated fatty acids (i. e., fatty acids having two or more double bonds) of high molecular weight (as occur e. g. in the natural drying oils) with polysaccharides including the disaccharides. These esters were found to be very valuable materials for the preparation of drying oils, varnishes, lakes, artificial threads, films, plastic compositions or the like. The new products are obtained by esterification in the known way of the above mentioned poly unsaturated acids, e. g. linoleic acid ($C_{18}H_{32}O_2$), linoleic acid ($C_{18}H_{30}O_2$), etc. from any of the wood oils, the train oils (blubber oils), etc., possessing a high iodine value, with the polysaccharides of which starch, cellulose or its derivatives, cane sugar or the like amongst many others are particularly valuable starting materials. The poly unsaturated fatty acids need not be pure but may be accompanied by mono unsaturated fatty acids and/or saturated fatty acids in mixtures such as occur in natural drying oils of high iodine value.

The new products are viscous sticky and scarcely flowing oils soluble, for instance, in aromatic and aliphatic hydrocarbons and turpentine, as well as in drying and non-drying oils and they are oxidized in the air, as the result of which they are rendered totally insoluble. The starch and cellulose esters of saturated fatty acids on the one hand and of the new unsaturated fatty acids on the other hand show conspicuous differences, which art particularly characteristic. The former do not lose their solubility on heating, whilst the latter are rendered insoluble after some time. This change may not necessarily be due to the action of the oxygen of the air, as it can also be brought about by heating the products in vacuo.

The drying process can be appreciably shortened by addition of small quantities of known siccatives.

In order to fully illustrate the invention the following examples are given, without limiting ourselves to the exact proportions or conditions.

*Example 1.*—30 parts by weight of cane sugar are dissolved in about 500 parts by weight of pyridine at a temperature of about 70–80° C. To this solution 220–240 parts by weight of linoleic acid chloride are slowly added. When the reaction is finished the resulting liquid is introduced into dilute hydrochloric acid and the precipitated ester is washed with a dilute solution of sodium carbonate until free from linoleic acid. The ester is a limpid viscous oil soluble in any desired proportion in benzine, turpentine, linseed oil and other drying and non-drying oils.

*Example 2.*—15 parts by weight of potato starch are added to a mixture of 130 parts by weight of the linoleic acid chloride and 35 parts by weight of dimethylaniline under vigorous stirring. Whilst continuing the stirring the mixture is heated to 110–120° C. for some 4 hours, after which the whole mass is caused to flow into alcohol. A tough yellowish-brown product separates which is washed repeatedly with alcohol and finally freed from the alcohol by heating it in vacuo at 60° C. The solubility properties of the resulting product resemble those of the product of Example 1.

Instead of starch the so-called "soluble starch" can be used. A solution of 50 parts by weight of this ester obtained from "soluble starch" and linoleic acid chloride in 50 parts by weight of lake benzine or turpentine with the addition of one part by weight of the cobalt salt of linoleic acid sets in about 6 hours to a hard elastic insoluble layer which resists mechanical and atmospheric influences.

The properties of the new varnishes can be modified by the addition of drying or non-drying oils or resins, as desired.

*Example 3.*—10 parts by weight of hydrocellulose are heated together with 23 parts by weight of dimethylaniline to 110–120° C. whilst stirring. 90–95 parts by weight of linoleic acid chloride are slowly added and the mixture is further heated for 5 hours to 110–120° C. under vigorous stirring. The thick viscous mass is then stirred repeatedly with fresh alcohol.

The new ester product is tough and soft and is advantageously stored whilst still impregnated with alcohol or in solution in benzene, ligroin benzine or the like. After removing the solvents by heating the ester in vacuo to 100° C. it is transformed into a product of high melting point which is now practically insoluble in most of the known solvents.

The new ester product can with advantage be used for the manufacture of plastic materials, films, bands, ribbons or the like which after drying become substantially insoluble in the usual solvents. Softening agents may be added.

Cellulose can be used instead of hydrocellulose in which case the heating must be prolonged for 8-10 hours, whilst maintaining the proportions above stated.

Having now particularly described and ascertained the nature of this invention and in what manner the same is to be performed, we declare that what we claim is:—

1. Process of preparing esters of poly unsaturated fatty acids of high molecular weight with polysaccharides which comprises heating to reaction temperature up to about 120° C. a mixture comprising a polysaccharide and a halogenide of a poly unsaturated fatty acid of high molecular weight in the presence of a tertiary organic base capable of binding a hydrohalic acid.

2. Process of preparing esters of poly unsaturated fatty acids of high molecular weight with polysaccharides which comprises heating to reaction temperature up to about 120° C. a mixture comprising a polysaccharide and a chloride of a poly unsaturated fatty acid of high molecular weight in the presence of an hydrochloric acid binding agent.

3. Process of preparing esters of linoleic acid with polysaccharides which comprises heating to about 110–120° C. a mixture comprising linoleic acid chloride and a polysaccharide in the presence of a tertiary organic base capable of binding hydrochloric acid.

4. A product comprising an ester of a poly unsaturated fatty acid of high molecular weight with a polysaccharide, which product is a viscous, sticky, oily material, soluble in hydrocarbons, turpentine and oils and capable of oxidizing in the air to an insoluble product and is suitable for use in the manufacture of drying oils, varnishes, lakes, artificial threads, films, bands, ribbons, plastic masses and the like.

5. A product comprising an ester of linoleic acid and a polysaccharide which product is soluble in hydrocarbons, turpentine and oils and capable of being transformed by heating and by atmospheric oxidation into an insoluble product.

In testimony whereof we have hereunto set our hands.

LEO ROSENTHAL.
WOLFGANG LENHARD.